(12) United States Patent
Chen et al.

(10) Patent No.: US 11,924,562 B2
(45) Date of Patent: Mar. 5, 2024

(54) LOW-POWER IMAGE SENSOR (71) Applicant: OmniVision Sensor Solution (Shanghai) Co., Ltd, Shanghai (CN)

(72) Inventors: Shoushun Chen, Shanghai (CN); Menghan Guo, Shanghai (CN)

(73) Assignee: OMNIVISION SENSOR SOLUTION (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 17/968,853

(22) Filed: Oct. 19, 2022

(65) Prior Publication Data

US 2023/0039144 A1 Feb. 9, 2023

Related U.S. Application Data

(63) Continuation of application No. PCT/CN2020/089018, filed on May 7, 2020.

(30) Foreign Application Priority Data

Apr. 26, 2020 (CN) .......................... 202010340899.7

(51) Int. Cl.
*H04N 25/50* (2023.01)
*H04N 25/74* (2023.01)
*H04N 25/75* (2023.01)

(52) U.S. Cl.
CPC ............. *H04N 25/50* (2023.01); *H04N 25/74* (2023.01); *H04N 25/75* (2023.01)

(58) Field of Classification Search
CPC ........ H04N 25/50; H04N 25/74; H04N 25/75; H04N 23/71; H04N 25/707; H04N 25/709; H04N 25/47; H04N 25/70
See application file for complete search history.

(56) References Cited

U.S. PATENT DOCUMENTS

2018/0191972 A1 7/2018 Berner et al.
2022/0038645 A1* 2/2022 Takahashi .............. H04N 25/47

FOREIGN PATENT DOCUMENTS

CN 109040711 A 12/2018
CN 109842767 A 6/2019
EP 3376754 A1 9/2018

OTHER PUBLICATIONS

Huang Jing et.al., "Event-Guided Structured Output Tracking of Fast-Moving Objects Using a CeleX Sensor", IEEE Transactions on Circuits and Systems for Video Technology. vol. 28, No. 9, Sep. 30, 2018.

* cited by examiner

*Primary Examiner* — Nicholas G Giles
(74) *Attorney, Agent, or Firm* — IPRO, PLLC (57) ABSTRACT

The present disclosure provides an image sensor, which includes: a pixel collection circuit array including a plurality of pixel collection circuits, each pixel collection circuit being configured to monitor a change in a light intensity in a field of view and enter a triggered state when the change in the light intensity meets a predetermined condition; a global control unit configured to reset the pixel collection circuit array when the image sensor is powered on, and control the pixel collection circuit array in a stable initial state to operate; a photo current detection unit configured to determine whether there is the change in the light intensity, and control an operating state of at least one pixel collection circuit in accordance with the detected change in the light intensity; and a reading unit configured to respond to the pixel collection circuit in the triggered state and output corresponding address information.

14 Claims, 4 Drawing Sheets

Fig.4C

LOW-POWER IMAGE SENSOR

TECHNICAL FIELD

The present disclosure relates to the field of image collection technology, in particular to an image sensor.

BACKGROUND

For an image sensor, the detection of a moving object is one of its various applications. As compared with a conventional image sensor (e.g., an active pixel sensor), a dynamic vision image sensor (referred to as dynamic vision sensor for short) has attracted more and more attentions due to its unique advantages.

Due to a pixel unit (also called as pixel collection circuit) designed on the basis of a bionic principle, the dynamic vision sensor is capable of continuously responding to a change in a light intensity in a field of view in real time without any exposure time, so it may detect an object moving at a high speed easily. In addition, the dynamic vision sensor merely responds to, and outputs, position information about the pixel unit corresponding to a region where the change in the light intensity in the field of view occurs, and automatically filters out useless background information, so it has such advantages as small data volume and small occupied bandwidth. Due to these advantages, a back-end image processing system may directly acquire and process useful dynamic information in the field of view, so as to remarkably reduce the requirement on a storage capacity and a computation capability, and improve the real-time performance.

In order to continuous monitor the change in the light intensity, all the pixel units in the dynamic vision sensor are in an operating state (i.e., the power consumption occurs all the time), no matter whether there is the change in the light intensity at the corresponding region. It means that, the static power consumption occurs for the dynamic vision sensor no matter whether there is the movement in the field of view. In addition, the power consumption increases along with an increase in a resolution of the sensor. This is adverse to an application scenario and a system where the power consumption of the sensor is highly demanded.

On the other hand, in actual use, the movement is not always continuous in space and time. In some application scenarios, e.g., video surveillance, no movement may occur in the field of view for a long time, i.e., the movement merely occurs within a short time period. In some other application scenarios, e.g., gesture recognition, the movement merely occurs in a local region in the field of view. As mentioned hereinabove, the pixel units in the conventional dynamic vision sensor operate all the time, so it is impossible to reduce the power consumption of the dynamic vision sensor in different application scenarios, and thereby the application of the dynamic vision sensor in a system with low power consumption is limited.

In a word, there is an urgent need to provide a new image sensor so as to solve the above-mentioned problems.

SUMMARY

An object of the present disclosure is to provide an image sensor, so as to solve or at least alleviate at least one of the above-mentioned problems.

The present disclosure provides in some embodiments an image sensor, including: a pixel collection circuit array including a plurality of pixel collection circuits, each pixel collection circuit being configured to monitor a change in a light intensity in a field of view and enter a triggered state when the change in the light intensity meets a predetermined condition; a global control unit coupled to the pixel collection circuit array, and configured to reset the pixel collection circuit array when the image sensor is powered on, and control the pixel collection circuit array to operate when the pixel collection circuit array is maintained in a stable initial state; a photo current detection unit coupled to the pixel collection circuit array, and configured to determine whether there is the change in the light intensity in the pixel collection circuit array, and control an operating state of at least one pixel collection circuit in accordance with the detected change in the light intensity; and a reading unit configured to respond to the pixel collection circuit in the triggered state and output corresponding address information.

In a possible embodiment of the present disclosure, the photo current detection unit includes at least one photo current detection module. One photo current detection module is coupled to the pixel collection circuits in at least one row, and configured to detect whether there is the change in the light intensity at a region in a field of view corresponding to the coupled pixel collection circuits, control the pixel collection circuits in the row to be in the operating state when there is the change in the light intensity, and control the pixel collection circuits in the row to be in an off state when there is no change in the light intensity.

In a possible embodiment of the present disclosure, the pixel collection circuit array is coupled to the photo current detection unit via a pixel collection circuit enabling signal line and a photo current detection signal line, coupled to the global control unit via a global resetting signal line, and coupled to the reading unit via a row request line, a row selection line, a column request line and a column selection line.

In a possible embodiment of the present disclosure, the photo current detection module includes: a photo current detection sub-module configured to monitor in real time a total photo current of a corresponding pixel collection circuit transmitted via the photo current detection signal line, and generate a first electric signal in accordance with the total photo current; a triggering generation sub-module coupled to the photo current detection sub-module and configured to generate a triggering signal when the first electric signal meets a threshold condition; and an enabling control generation sub-module coupled to the triggering generation sub-module and configured to output an enabling signal via the pixel collection circuit enabling signal line upon the receipt of the triggering signal.

In a possible embodiment of the present disclosure, the triggering generation sub-module includes: a filtration amplifier, an input end of which is coupled to an output end of the photo current detection sub-module, and which is configured to filter and amplify the first electric signal, and output the processed first electric signal; and a threshold comparison sub-unit, an input end of which is coupled to an output end of the filtration amplifier, and which is configured to determine whether the processed first electric signal meets the threshold condition, and generate the triggering signal when the threshold condition has been met.

In a possible embodiment of the present disclosure, the photo current detection module includes: a current adapter sub-module configured to output a total photo current of a corresponding pixel collection circuit transmitted via the photo current detection signal line to a triggering generation sub-module; the triggering generation sub-module coupled to the current adapter sub-module and configured to generate the triggering signal in accordance with the total photo current; and an enabling control generation sub-module coupled to the triggering generation sub-module and configured to output an enabling signal via the pixel collection circuit enabling signal line upon the receipt of the triggering signal.

In a possible embodiment of the present disclosure, the current adapter sub-module includes: a first amplifier and a first transistor, an input end of the first amplifier being coupled to a source electrode of the first transistor, an output end of the first amplifier being coupled to a gate electrode of the first transistor, the first amplifier and the first transistor forming a negative feedback circuit for maintaining the photo current detection signal line at a fixed voltage; a second transistor, a source electrode of which is coupled to a drain electrode of the first transistor; and a third transistor, a drain electrode and a gate electrode of which are coupled to a drain electrode and a gate electrode of the second transistor respectively, a source electrode of which is coupled to the triggering generation sub-module, so as to transmit the photo current from the photo current detection signal line to the triggering generation sub-module.

In a possible embodiment of the present disclosure, the triggering generation sub-module includes: a current mode conversion sub-unit configured to quantize the received total photo current, and output a quantized value to a difference determination sub-unit; and the difference determination sub-unit configured to generate the triggering signal when a difference between two adjacent quantized values is greater than a predetermined value.

In a possible embodiment of the present disclosure, the photo current detection module includes: a voltage conversion sub-module configured to convert a total photo current of a corresponding pixel collection circuit transmitted via the photo current detection signal line into a voltage signal, and output the voltage signal to a triggering generation sub-module; the triggering generation sub-module coupled to the voltage conversion sub-module and configured to generate a triggering signal in accordance with the voltage signal; and an enabling control generation sub-module coupled to the triggering generation sub-module and configured to output an enabling signal via the pixel collection circuit enabling signal line upon the receipt of the triggering signal.

In a possible embodiment of the present disclosure, the voltage conversion sub-module includes: a second amplifier, an input end of which is coupled to the photo current detection signal line, and an output end of which is coupled to the triggering generation sub-module; and a first capacitor and a first switch connected in parallel to each other between the input end and the output end of the second amplifier.

In a possible embodiment of the present disclosure, the triggering generation sub-module includes: a voltage mode conversion sub-unit configured to quantize the received voltage signal and output a quantized value to a difference determination sub-unit; and the difference determination sub-unit configured to generate the triggering signal when a difference between two adjacent quantized values is greater than a threshold.

In a possible embodiment of the present disclosure, the enabling control generation sub-module includes: a timer configured to be started upon the receipt of the triggering signal, generate a resetting signal when a duration of the timer reaches a predetermined value and no pixel collection circuit is triggered in a corresponding field of view, and output the resetting signal to a latch; and the latch configured to be set upon the receipt of the triggering signal and output an active enabling signal via the pixel collection circuit enabling signal line, and configured to output an inactive enabling signal via the pixel collection circuit enabling signal line upon the receipt of the resetting signal.

In a possible embodiment of the present disclosure, the reading unit includes: a row selection module configured to control the pixel collection circuit array in a row direction; a column selection module configured to control the pixel collection circuit array in a column direction; and a reading control module coupled to the row selection module and the column selection module, and configured to control an output of each of the row selection module and the column selection module.

In a possible embodiment of the present disclosure, the pixel collection circuit includes: a photoelectric detection module configured to monitor in real time an optical signal and output a second electric signal; a triggering generation module, a first input end of which is coupled to the photoelectric detection module, a first output end of which is coupled to an interface logic module, and which is configured to generate a triggering generation signal when the second electric signal meets a predetermined triggering condition, and output the triggering generation signal to the interface logic module; and the interface logic module coupled to the triggering generation module, and configured to communication with the reading unit via the row request line, the row selection line, the column request line and the column selection line.

In a possible embodiment of the present disclosure, the photoelectric detection module includes: a photodiode, an anode of which is grounded; a fourth transistor, a source electrode of which is coupled to a cathode of the photodiode, and a drain electrode of which is coupled to the photo current detection signal line; and a third amplifier coupled between the cathode of the photodiode and a gate electrode of the fourth transistor.

In a possible embodiment of the present disclosure, the triggering generation module is further coupled to be coupled to be pixel collection circuit enabling signal line through an enabling end, and configured to receive an enabling signal from the pixel collection circuit enabling signal line, so as to adjust the operating state of the pixel collection circuit.

According to the image sensor in the embodiments of the present disclosure, the operating state of each pixel collection circuit is controlled through the photo current detection unit. To be specific, the photo current detection units detects whether there is the change in the light intensity in a certain region at low power consumption, controls the pixel collection circuit corresponding to the region to be turned on merely when there is the change in the light intensity in the region, and controls the pixel collection circuit in a region where no change in the light intensity has been detected to be maintained in an off state. As a result, it is able to reduce the power consumption of the image sensor.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Figure 1:
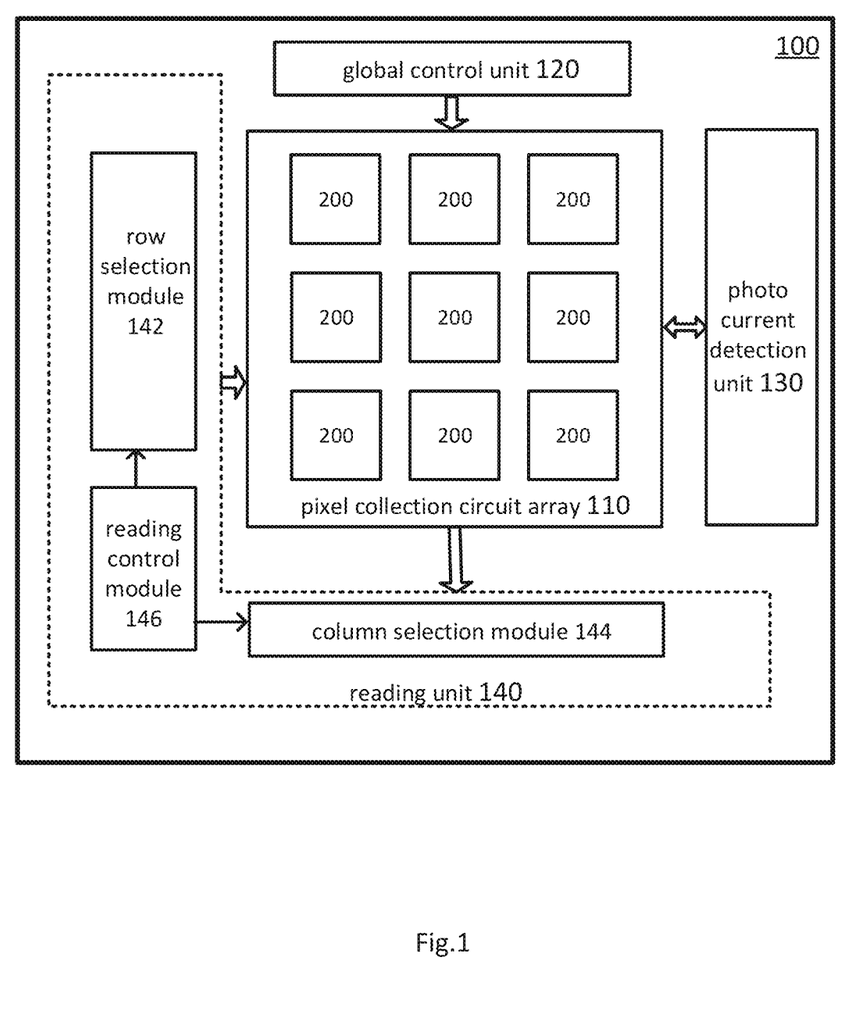
FIG. 1 is a schematic view showing an image sensor 100 according to one embodiment of the present disclosure.

As shown in FIG. 1, the present disclosure provides in some embodiments an image sensor 100. The image sensor 100 is capable of detecting the discontinuous movement in space and time. In a possible embodiment of the present disclosure, the image sensor 100 is coupled to an external image sensor, and configured to transmit an event data stream to the external image sensor for the subsequent calculation and application, which will not be particularly defined herein.

According to the embodiments of the present disclosure, on the basis of a conventional dynamic vision sensor, the image sensor 100 is provided with an additional photo current detection unit, so as to detect whether there is a change in a light intensity in a specific region at low power consumption. For the region where the change in the light intensity has been detected, a corresponding pixel collection circuit is in a normal operating state, so as to further monitor the change in the light intensity in the field of view, thereby to determine whether it needs to enter a triggered state. For the region where the change in the light intensity has not been detected yet, a corresponding pixel collection circuit is in an off state, so as to reduce the power consumption of the image sensor.

As shown in FIG. 1, the image sensor 100 includes a pixel collection circuit array 110, a global control unit 120, a photo current detection unit 130 and a reading unit 140. As a core part of the image sensor 100, the pixel collection circuit array 110 includes a plurality of pixel collection circuits 200 arranged in rows and columns evenly (e.g., FIG. 1 shows a 3*3 pixel collection circuit array). The pixel collection circuit array 110 is coupled to the global control unit 120, the photo current detection unit 130 and the reading unit 140. More particularly, in a possible embodiment of the present disclosure, the pixel collection circuit array 110 is coupled to the photo current detection unit 130 via a pixel collection circuit enabling signal line and a photo current detection signal line, coupled to the global control unit 120 via a global resetting signal line, and coupled to the reading unit 140 via a row request line, a row selection line, a column request line and a column collection line.

In the embodiments of the present disclosure, the global control unit 120 is configured to control an operating state of each pixel collection circuit 200. Generally, the global control unit 120 takes charge of resetting the entire pixel collection circuit array 110 when the image sensor 100 is powered on, so as to enable each pixel collection circuit 112 to be maintained in a stable initial state. Then, the pixel collection circuit array 110 starts to operate normally.

In the embodiments of the present disclosure, the image sensor 100 merely responds to the change in the light intensity in the field of view, and its function is mainly achieved through the pixel collection circuits 200. The pixel collection circuit 200 in the pixel collection circuit array 110 starts to response to the change in the light intensity under the control of the global control unit 120. To be specific, the pixel collection circuit array 110 monitors the change in the light intensity in the field of view, and enters a triggered state when the change in the light intensity meets a predetermined condition (e.g., when the change in the light intensity is greater than a predetermined value). In some embodiments of the present disclosure, the pixel collection circuit in the triggered state is also called as a triggered pixel event or a triggered event.

The reading unit 140 responds to the pixel collection circuit 200 in the triggered state, and outputs address information about the pixel collection circuit 200. Referring to FIG. 1 again, the reading unit 140 includes a row selection module 142, a column selection module 144 and a reading control module 146. The row selection module 142 is configured to control the pixel collection circuit array 110 in a row direction. The column selection module 144 is configured to control the pixel collection circuit array 110 in a column direction. The reading control module 146 is coupled to the row selection module 142 and the column selection module 144, and configured to control outputs of the row selection module 142 and the column selection module 144 in a coordinated manner. In a possible embodiment of the present disclosure, the row selection module 142 and the column selection module 144 are each an arbiter for scanning the pixel collection circuits randomly, or a selection scanning circuit for scanning the pixel collection circuits in a predetermined order, which will not be particularly defined herein.

The photo current detection unit 130 includes at least one photo current detection module. One photo current detection module is coupled to the pixel collection circuits in at least one row via the corresponding pixel collection circuit enabling signal line and the corresponding photo current detection signal line, and configured to detect whether there is the change in the light intensity at a region in the field of view corresponding to the coupled pixel collection circuits 200. In a possible embodiment of the present disclosure, the photo current detection unit controls the pixel collection circuits 200 in a row or rows to be in the operating state when there is the change in the light intensity, and controls the pixel collection circuits 200 in the row or rows to be in the off state when there is no change in the light intensity.

To be specific, after a global resetting signal is not provided by the global control unit 120, the photo current detection unit 130 controls the pixel collection circuit to be in the off state through the pixel collection circuit enabling signal line, so as to reduce the power consumption of the pixel collection circuit array 110. In addition, the photo current detection unit 130, e.g., one or more photo current detection modules, detects whether there is the change in the light intensity in the corresponding region through the photo current detection signal line. When there is no change in the light intensity in the region, all the pixel collection circuits in the region are maintained in the off state, otherwise, all the pixel collection circuits in the region are started for the movement detection.

Figure 2:
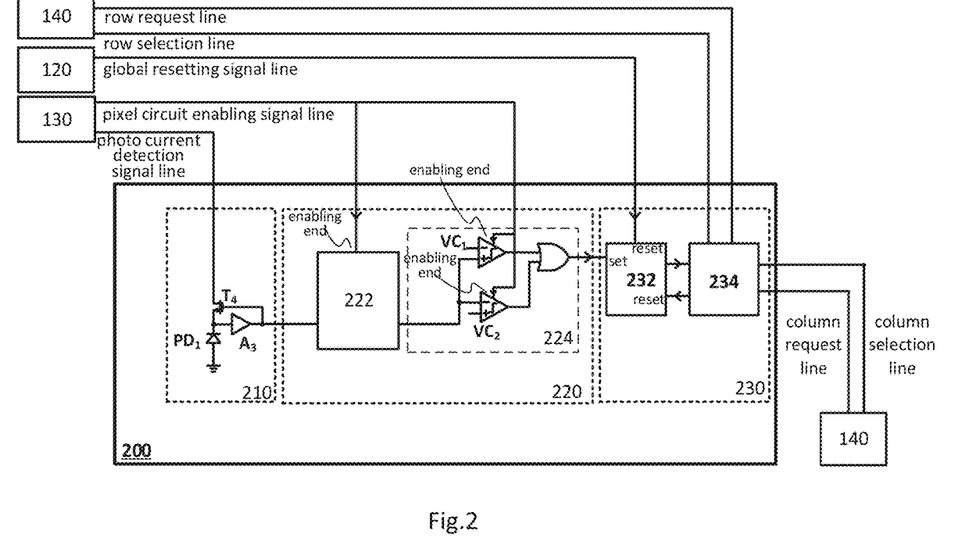
FIG. 2 is a schematic view showing a pixel collection circuit 200 according to one embodiment of the present disclosure.

As shown in FIG. 2, the pixel collection circuit 200 includes a photoelectric detection module 210, a triggering generation module 220 and an interface logic module 230. A first input end of the triggering generation module 220 is coupled to the photo detection module 210, and a first output end of the triggering generation module 220 is coupled to the interface logic module 230. In the embodiments of the present disclosure, the triggering generation module 220 includes a preprocessing sub-unit 222 and a threshold comparison sub-unit 224.

In a possible embodiment of the present disclosure, the photoelectric detection module 210 is configured to monitor in real time an optical signal and output a second electric signal. The triggering generation module 220 is configured to generate a triggering generation signal when the second electric signal meets a predetermined triggering condition, and output the triggering generation signal to the interface logic module 230. The interface logic module 230 communicates with the reading unit 140 via the row request line, the row selection line, the column request line and the column selection line.

As shown in FIG. 2, the photoelectric detection module 210 includes a photodiode $PD_1$ whose anode is grounded, a fourth transistor $T_4$ and a third amplifier $A_3$. A source electrode of the fourth transistor $T_4$ is coupled to a cathode of the photodiode $PD_1$, and a drain electrode of the fourth transistor $T_4$ is coupled to the photo current detection signal line. The third amplifier $A_3$ is coupled between the cathode of the photodiode $PD_1$ and a gate electrode of the fourth transistor $T_4$.

As shown in FIG. 2, an input end of the preprocessing sub-unit 222 is coupled to an output end of the photoelectric detection module 210, so as to preprocess the second electric signal from the photoelectric detection module 210. Here, the preprocessing mainly includes filtering and amplifying. In some embodiments of the present disclosure, when the signal is amplified, it is able to improve the detection sensitivity of the change in the light intensity. When the signal is filtered, it is able to filter out a low-frequency component in the signal, so as to prevent some background information with very slow change from being detected by the pixel collection circuit.

An input end of the threshold comparison sub-unit 224 is coupled to an output end of the preprocessing sub-unit 222, so as to receive the filtered and amplified second electric signal from the preprocessing sub-unit 22, and generate the triggering generation signal when the preprocessed second electric signal meets a predetermined condition.

When the second electric signal meets the predetermined condition, it means that a value of the second electric signal is within a certain range. The threshold comparison sub-unit 224 is implemented in the form of a voltage comparator. As shown in FIG. 2, the threshold comparison sub-unit 224 includes a first voltage comparator $VC_1$, a second voltage comparator $VC_2$ and an OR gate. A reverse-phase input end of the first voltage comparator $VC_1$ is coupled to a signal line providing a first threshold, and a same-phase input end of the first voltage comparator $VC_1$ is coupled to an output end of the preprocessing sub-unit 222. A normal-phase input end of the second voltage comparator $VC_2$ is coupled to a signal line providing a second threshold, and a reverse-phase input end of the second voltage comparator $VC_2$ is coupled to the output end of the preprocessing sub-unit 222. The OR gate is coupled to output ends of the first voltage comparator $VC_1$ and the second voltage comparator $VC_2$, so as to perform an OR logic operation on outputs from the first voltage comparator $VC_1$ and the second voltage comparator $VC_2$. In this way, the predetermined condition has been met when the second electric signal is greater than the first threshold or smaller than the second threshold.

Of course, the other predetermined condition may also be set for the threshold comparison sub-unit 224, which will not be particularly defined herein.

Referring to FIG. 2 again, the interface logic module 230 includes a latch 232 and a handshake protocol control logic module 234. The latch 232 is configured to store and represent a current operating state of the pixel collection circuit, and it is reset during the initialization of the pixel collection circuit. After the interface logic module 230 has received the triggering generation signal from the triggering generation module 220, the latch is set, so as to indicate that the pixel collection circuit is in the triggered state.

Then, the handshake protocol control logic module 234 is activated, and transmits a row request signal to the reading unit 140. In response to the row request signal, the reading unit 140 generates a corresponding row selection signal, and the handshake protocol control logic module 234 sets a column request signal as active. The reading unit 140 responds to the column request signal in the column direction, and generates a corresponding column selection signal. Upon the receipt of the row selection signal and the column selection signal simultaneously, the handshake protocol control logic module 234 resets the latch 232 and enables the triggering generation module 220. At this time, the pixel collection circuit may detect the change in the light intensity again.

In a word, as compared with the pixel collection circuit in the conventional dynamic vision sensor, the pixel collection circuit 200 in the embodiments of the present disclosure has the following advantages.

(1) In a photoelectric detection module of the conventional pixel collection circuit, a drain electrode of a transistor is coupled to a power source line, while in the photoelectric detection module 210 in the embodiments of the present disclosure, the drain electrode of the transistor is coupled to the photo current detection signal line.

(2) The triggering generation module 220 is provided with the enabling end through which the triggering generation module 220 is coupled to the pixel collection circuit enabling signal line to receive an enabling signal and adjust the operating state of the pixel collection circuit 200 in accordance with the received enabling signal. As shown in FIG. 2, the preprocessing sub-unit 222 and the comparators $VC_1$ and $VC_2$ of the threshold comparison sub-unit 224 are each provided with an additional enabling end (generally, the processing sub-unit 222 includes an amplifier for amplifying a signal, and the amplifier is provided with the enabling end), and the enabling end is coupled to the pixel collection circuit enabling signal line. When the enabling signal from the pixel collection circuit enabling signal line is inactive, the preprocessing sub-unit 222 (i.e., the amplifier) and the threshold comparison sub-unit 224 (i.e., the comparators $VC_1$ and $VC_2$) are all in an off state, and thereby no power consumption occurs. When the enabling signal from the pixel collection circuit enabling signal line is active, the preprocessing sub-unit 222 (i.e., the amplifier) and the threshold comparison sub-unit 224 (i.e., the comparators $VC_1$ and $VC_2$) are in a normal operating state.

In addition, the photo current detection signal line and the pixel collection circuit enabling signal line form a bus through which the pixel collection circuit array 110 is coupled to the photo current detection unit 130. The photo current detection module in the photo current detection unit 130 detects whether there is the change in the light intensity in a specific region through the photo current detection signal line, and controls the operating state of the pixel collection circuit in the region through the pixel collection circuit enabling signal line in accordance with a detection result.

It should be appreciated that, the pixel collection circuit in the dynamic vision sensor is known in the art, and the structures and functions of the other components of the pixel collection circuit will not be particularly defined herein.

Referring to FIG. 2 again, a plurality of pixel collection circuits is arranged in a row and corresponds to one photo current detection module. At this time, the photo current detection signal lines for all the pixel collection circuits in the row are coupled to each other, and the pixel collection circuit enabling signal lines are coupled to each other too. The photo current detection signal lines and the pixel collection circuit enabling signal lines are coupled to one photo current detection module, and the photo current detection module takes charge of detecting whether there is the change in the light intensity in a corresponding region in the field of view and thereby controlling the operating state of the pixel collection circuits in the row. At the beginning, the enabling signal from the pixel collection circuit enabling signal line is inactive, so the triggering generation unit of each pixel collection circuit is disabled. The photo current detection signal line is set at a constant potential through the photo current detection module. A photo current generated by the photodiode $PD_1$ flows through the photo current detection signal line, so the photo current detection module may obtain a total photo current of the pixel collection circuits in the row through the photo current detection signal lines.

Hence, one photo current detection module is coupled to the pixel collection circuits in at least one row, so as to detect the change in the light intensity in a specific region. In different application scenarios, the specific region may correspond to the pixel collection circuits in one row or several rows, or the entire pixel collection circuit array.

Figure 3A:
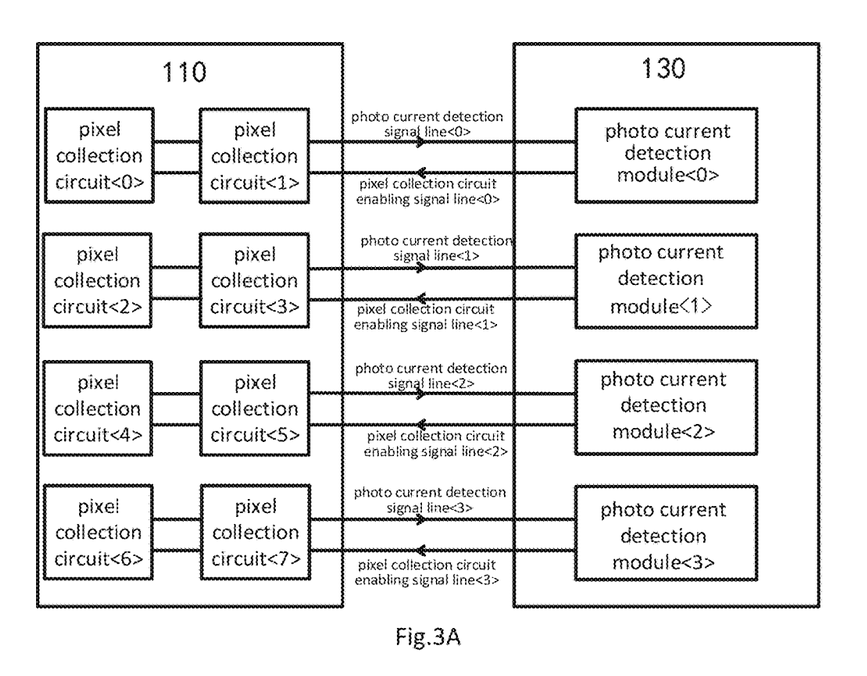
FIGS. 3A to 3C are schematic views showing the coupling of a pixel collection circuit array to a photo current detection unit according to one embodiment of the present disclosure.
Figure 3B:
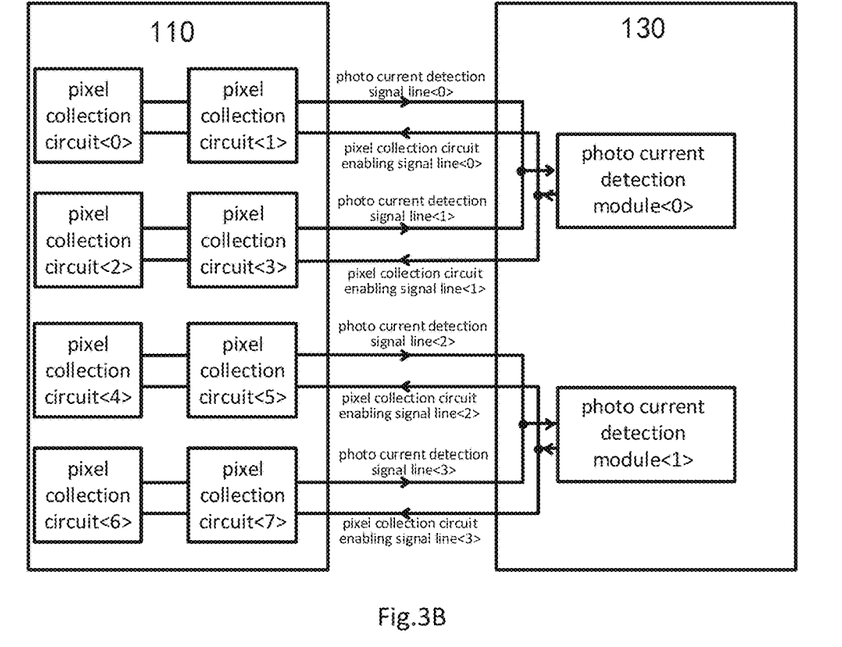
Figure 3C:
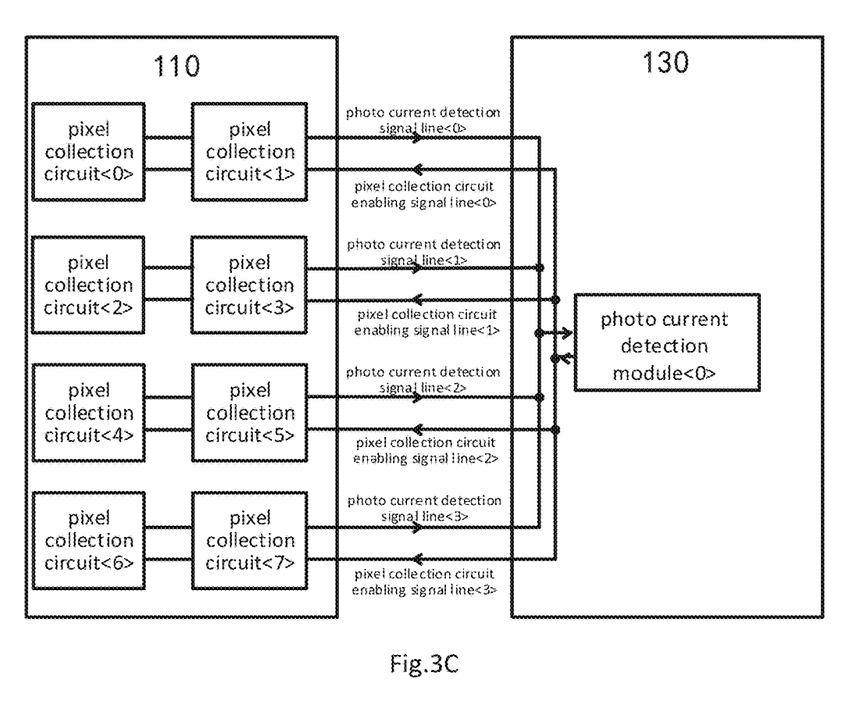

In order to describe the detection of the photo current in a specific region and the controller over the pixel collection circuits through the photo current detection unit 130, FIGS. 3A to 3C show several connection modes between the pixel collection circuit array 110 and the photo current detection unit 130. For ease of description, the pixel collection circuit array merely includes eight pixel collection circuits 200 in four rows and two columns, i.e., pixel collection circuits <0>, <1> . . . , and <7>. It should be appreciated that, the quantity of pixel collection circuits in the pixel collection circuit array will not be particularly defined herein.

In FIG. 3A, the photo current detection unit 130 includes four photo current detection modules, i.e., photo current detection modules <0>, <1>, <2> and <3>. Each photo current detection module corresponds to the pixel collection circuits in one row. For example, the photo current detection module <0> is coupled to the pixel collection circuits in a first row (i.e., the pixel collection circuits <0> and <1> in FIG. 3A) via a photo current detection signal line <0> and a pixel collection circuit enabling signal line <0>, and so on. In this connection mode, the photo current detection unit 130 may detect the photo current of the pixel collection circuits on a single-row basis and control the corresponding pixel collection circuits.

In FIG. 3B, the photo current detection unit 130 includes two photo current detection modules, i.e., photo current detection modules <0> and <1>. Each photo current detection module corresponds to the pixel collection circuits in two rows. For example, the photo current detection module <0> is coupled to the pixel collection circuits in a first row and a second row (i.e., the pixel collection circuits <0>, <1>, <2> and <3> in FIG. 3B) via a photo current detection signal line <0>, a photo current detection signal line <0>, a pixel collection circuit enabling signal line <0> and a pixel collection circuit enabling signal line <1>, and so on. In this connection mode, the photo current detection unit 130 may detect the photo current of the pixel collection circuits on a two-row basis and control the corresponding pixel collection circuits.

In FIG. 3C, the photo current detection unit 130 merely includes one photo current detection module <0>, which takes charge of detecting the photo current in the entire field of view and controlling the entire pixel collection circuit array 110 including the pixel collection circuits <0>, <1>, . . . , <6> and <7> in FIG. 3C.

Figure 4A:
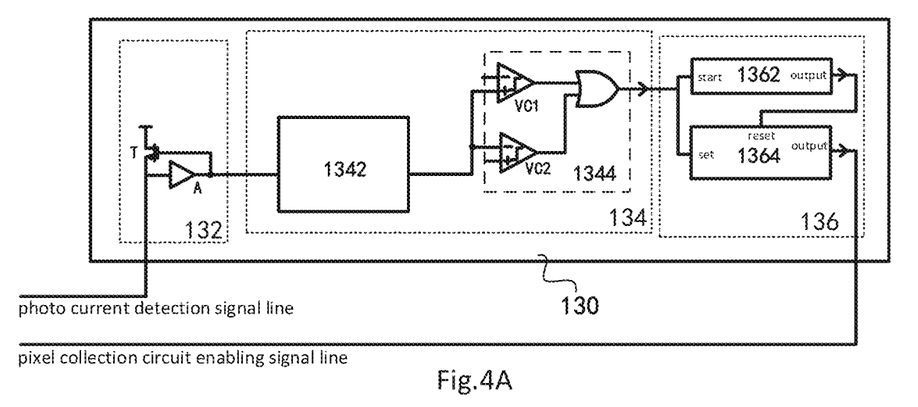
FIGS. 4A to 4C are schematic views showing a photo current detection module in the photo current detection unit according to one embodiment of the present disclosure.
Figure 4B:
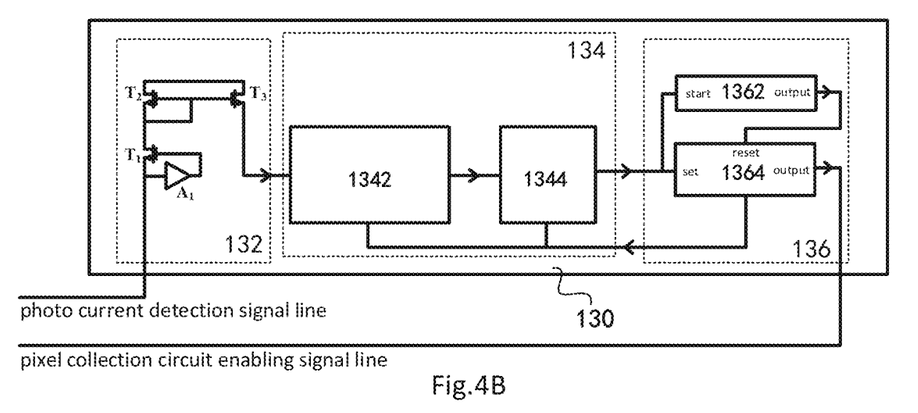
Figure 4C:
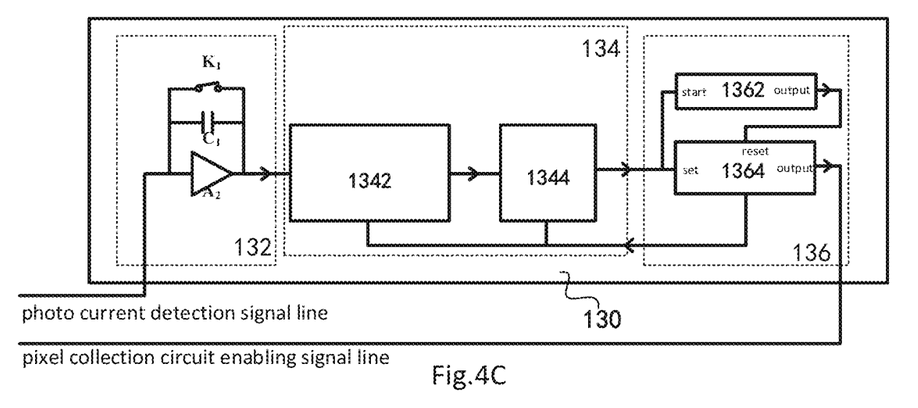

FIGS. 4A to 4C show the photo current detection module in the photo current detection unit 130.

As shown in FIG. 4A, in a possible embodiment of the present disclosure, the photo current detection module includes a photo current detection sub-module 132, a triggering generation sub-module 134 and an enabling control generation sub-module 136.

In the embodiments of the present disclosure, the photo current detection sub-module 132 senses and monitors in real time a total photo current of the corresponding pixel collection circuit transmitted through the photo current detection signal line (i.e., the pixel collection circuit in a specific region), generates a first electric signal, and transmits it to the triggering generation sub-module 134. The triggering generation sub-module 134 includes a filtration amplifier 1342 and a threshold comparison sub-unit 1344 for filtering and amplifying the first electric signal and determining whether the processed first electric signal meets a threshold condition (with reference to relevant description about the triggering generation module in the pixel collection circuit). When the first electric signal meets the threshold condition, i.e., the total photo current in the specific region changes, the triggering generation sub-module 134 generates a triggering signal and outputs it to the enabling control generation sub-module 136. Upon the receipt of the triggering signal, the enabling control generation sub-module 136 outputs an enabling signal through the pixel collection circuit enabling signal line.

The enabling control generation sub-module 136 includes a timer 1362 and a latch 1364. The timer 1362 is configured to be started upon the receipt of the triggering signal, generate a resetting signal when a duration of the timer reaches a predetermined value and no pixel collection circuit is triggered in a corresponding field of view, and output the resetting signal to the latch 1364. The latch 1364 is configured to be set upon the receipt of the triggering signal and output an active enabling signal via the pixel collection circuit enabling signal line. In addition, the latch 1364 is further configured to output an inactive enabling signal via the pixel collection circuit enabling signal line upon the receipt of a resetting signal. For example, at the beginning, the latch 1364 is reset, so that the enabling signal from the pixel collection circuit enabling signal line is inactive. Upon the receipt of the triggering signal from the triggering generation sub-module 134, the latch 1364 is set, so that the enabling signal from the pixel collection circuit enabling signal line is active and the pixel collection circuit at a corresponding region starts to operate to generate an event. The timer 1362 in the enabling control generation sub-module 136 is started when the triggering signal is active. When the duration of the timer reaches the predetermined value and no event is detected in the specific region, the resetting signal is generated and outputted to the latch 1364. At this time, the enabling signal from the pixel collection circuit enabling signal line is set to be inactive again, and the pixel collection circuit in the corresponding region is in the off state again.

As shown in FIG. 4B, in another possible embodiment of the present disclosure, the photo current detection module includes a current adapter sub-module 132, a triggering generation sub-module 134 and an enabling control generation sub-module 136. The current adapter sub-module 132 outputs the total photo current of the corresponding pixel collection circuit transmitted through the photo current detection signal line to the triggering generation sub-module 134. In a possible embodiment of the present disclosure, the current adapter sub-module 132 includes a first amplifier $A_1$, a first transistor $T_1$, a second transistor $T_2$ and a third transistor $T_3$. An input end of the first amplifier $A_1$ is coupled to a source electrode of the first transistor $T_1$, an output end of the first amplifier $A_1$ is coupled to a gate electrode of the first transistor $T_1$, and the first amplifier $A_1$ and the first transistor $T_1$ form a negative feedback circuit to maintain the photo current detection signal line at a constant voltage. A source electrode of the second transistor $T_2$ is coupled to a drain electrode of the first transistor $T_1$, and a drain electrode and a source electrode of the second transistor $T_2$ are coupled to a drain electrode and a gate electrode of the third transistor $T_3$ respectively. A source electrode of the third transistor $T_3$ is coupled to the triggering generation sub-module 134, so as to output the photo current from the photo current detection signal line to the triggering generation sub-module 134.

In addition, the triggering generation sub-module 134 includes a current mode conversion sub-unit 1342 and a difference determination sub-unit 1344. The current mode conversion sub-unit 1342 is configured to quantize the received total photo current, and output a quantized value (usually in the form of digital bits) to the difference determination sub-unit 1344. The difference determination sub-unit 1344 is configured to generate the triggering signal when a difference between two adjacent quantized values is greater than a predetermined value. The enabling control generation sub-module 136 in FIG. 4B is completely the same as that in FIG. 4A, and thus will not be particularly defined herein. In addition, the current mode conversion sub-unit 1342 is known in the art, and thus will not be particularly defined herein. The difference determination sub-unit 1344 may be implemented in the form of a digital adder and a comparator, and thus will not be particularly defined herein.

As shown in FIG. 4C, in yet another possible embodiment of the present disclosure, the photo current detection module includes a voltage conversion sub-module 132, a triggering generation sub-module 134 and an enabling control generation sub-module 136. The triggering generation sub-module 134 is coupled to the voltage conversion sub-module 132 and the enabling control generation sub-module 136.

In the embodiments of the present disclosure, the voltage conversion sub-module 132 is configured to convert a total photo current of a corresponding pixel collection circuit transmitted via the photo current detection signal line into a voltage signal, and output the voltage signal to the triggering generation sub-module 134. The voltage conversion sub-module 132 includes a second amplifier $A_2$, a first capacitor $C_1$ and a first switch $K_1$. As shown in FIG. 4C, an input end of the second amplifier $A_2$ is coupled to the photo current detection signal lines, and an output end thereof is coupled to the triggering generation sub-module 134. The first capacitor $C_1$ and the first switch $K_1$ are connected in parallel to each other between the input end and the output end of the second amplifier $A_2$.

The triggering generation sub-module 134 is configured to generate the triggering signal in accordance with the voltage signal. As shown in FIG. 4C, the triggering generation module 134 includes a voltage mode conversion sub-unit 1342 and a difference determination sub-unit 1344.

The voltage mode conversion sub-unit 1342 is configured to quantize the received voltage signal and output a quantized value (usually in the form of digital bits) to the difference determination sub-unit 1344. The difference determination sub-unit 1344 is configured to generate the triggering signal when a difference between two adjacent quantized values is greater than a threshold.

The enabling control generation sub-module 136 is configured to output an enabling signal via the pixel collection circuit enabling signal line upon the receipt of the triggering signal. The enabling control generation sub-module 136 in FIG. 4C is completely the same as that in FIG. 4A, and thus will not be particularly defined herein. The voltage mode conversion sub-module 1342 is known in the art, and thus will not be particularly defined herein. The difference determination sub-unit 1344 may be implemented in the form of a digital adder and a comparator, and thus will not be particularly defined herein.

According to the embodiments of the present disclosure, the image sensor may detect the discontinuous movement in space and time, and the pixel collection circuits which do not need to detect the movement are turned off so as to reduce the power consumption of the image sensor. To be specific, the photo current detection units detects whether there is the change in the light intensity in a certain region at low power consumption, controls the pixel collection circuit corresponding to the region to be turned on merely when there is the change in the light intensity in the region, and controls the pixel collection circuit in a region where no change in the light intensity has been detected to be maintained in an off state. As a result, it is able to reduce the power consumption of the image sensor.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. An image sensor, comprising:
a pixel collection circuit array comprising a plurality of pixel collection circuits, each pixel collection circuit being configured to monitor a change in a light intensity in a field of view and enter a triggered state when the change in the light intensity meets a predetermined condition;
a global control unit coupled to the pixel collection circuit array, and configured to reset the pixel collection circuit array when the image sensor is powered on, and control the pixel collection circuit array to operate when the pixel collection circuit array is maintained in a stable initial state;
a photo current detection unit coupled to the pixel collection circuit array, and configured to determine whether there is the change in the light intensity in the pixel collection circuit array, and control an operating state of at least one pixel collection circuit in accordance with the detected change in the light intensity; and
a reading unit configured to respond to the pixel collection circuit in the triggered state and output corresponding address information,
wherein the photo current detection unit comprises at least one photo current detection module, wherein each photo current detection module is coupled to the pixel collection circuits in at least one row, and configured to detect whether there is the change in the light intensity at a region in a field of view corresponding to the coupled pixel collection circuits, control the pixel collection circuits in the row to be in the operating state when there is the change in the light intensity, and control the pixel collection circuits in the row to be in an off state when there is no change in the light intensity, and
the pixel collection circuit array is coupled to the photo current detection unit via a pixel collection circuit enabling signal line and a photo current detection signal line, coupled to the global control unit via a global resetting signal line, and coupled to the reading unit via a row request line, a row selection line, a column request line and a column selection line.

2. The image sensor according to claim 1, wherein the photo current detection module comprises:
a photo current detection sub-module configured to monitor in real time a total photo current of a corresponding pixel collection circuit transmitted via the photo current detection signal line, and generate a first electric signal in accordance with the total photo current;
a triggering generation sub-module coupled to the photo current detection sub-module and configured to generate a triggering signal when the first electric signal meets a threshold condition; and
an enabling control generation sub-module coupled to the triggering generation sub-module and configured to output an enabling signal via the pixel collection circuit enabling signal line upon the receipt of the triggering signal.

3. The image sensor according to claim 2, wherein the triggering generation sub-module comprises:
a filtration amplifier, an input end of which is coupled to an output end of the photo current detection sub-module, and which is configured to filter and amplify the first electric signal, and output the processed first electric signal; and
a threshold comparison sub-unit, an input end of which is coupled to an output end of the filtration amplifier, and which is configured to determine whether the processed first electric signal meets the threshold condition, and generate the triggering signal when the threshold condition has been met.

4. The image sensor according to claim 1, wherein the photo current detection module comprises:
a current adapter sub-module configured to output a total photo current of a corresponding pixel collection circuit transmitted via the photo current detection signal line to a triggering generation sub-module;

the triggering generation sub-module coupled to the current adapter sub-module and configured to generate the triggering signal in accordance with the total photo current; and an enabling control generation sub-module coupled to the triggering generation sub-module and configured to output an enabling signal via the pixel collection circuit enabling signal line upon the receipt of the triggering signal.

5. The image sensor according to claim 4, wherein the current adapter sub-module comprises:

a first amplifier and a first transistor, an input end of the first amplifier being coupled to a source electrode of the first transistor, an output end of the first amplifier being coupled to a gate electrode of the first transistor, the first amplifier and the first transistor forming a negative feedback circuit for maintaining the photo current detection signal line at a fixed voltage;

a second transistor, a source electrode of which is coupled to a drain electrode of the first transistor; and a third transistor, a drain electrode and a gate electrode of which are coupled to a drain electrode and a gate electrode of the second transistor respectively, a source electrode of which is coupled to the triggering generation sub-module, so as to transmit the photo current from the photo current detection signal line to the triggering generation sub-module.

6. The image sensor according to claim 4, wherein the triggering generation sub-module comprises:

a current mode conversion sub-unit configured to quantize the received total photo current, and output a quantized value to a difference determination sub-unit; and the difference determination sub-unit configured to generate the triggering signal when a difference between two adjacent quantized values is greater than a predetermined value.

7. The image sensor according to claim 1, wherein the photo current detection module comprises:

a voltage conversion sub-module configured to convert a total photo current of a corresponding pixel collection circuit transmitted via the photo current detection signal line into a voltage signal, and output the voltage signal to a triggering generation sub-module;

the triggering generation sub-module coupled to the voltage conversion sub-module and configured to generate a triggering signal in accordance with the voltage signal; and an enabling control generation sub-module coupled to the triggering generation sub-module and configured to output an enabling signal via the pixel collection circuit enabling signal line upon the receipt of the triggering signal.

8. The image sensor according to claim 7, wherein the voltage conversion sub-module comprises:

a second amplifier, an input end of which is coupled to the photo current detection signal line, and an output end of which is coupled to the triggering generation sub-module; and a first capacitor and a first switch connected in parallel to each other between the input end and the output end of the second amplifier.

9. The image sensor according to claim 7, wherein the triggering generation sub-module comprises:

a voltage mode conversion sub-unit configured to quantize the received voltage signal and output a quantized value to a difference determination sub-unit; and the difference determination sub-unit configured to generate the triggering signal when a difference between two adjacent quantized values is greater than a threshold.

10. The image sensor according to claim 2, wherein the enabling control generation sub-module comprises:

a timer configured to be started upon the receipt of the triggering signal, generate a resetting signal when a duration of the timer reaches a predetermined value and no pixel collection circuit is triggered in a corresponding field of view, and output the resetting signal to a latch; and the latch configured to be set upon the receipt of the triggering signal and output an active enabling signal via the pixel collection circuit enabling signal line, and configured to output an inactive enabling signal via the pixel collection circuit enabling signal line upon the receipt of the resetting signal.

11. The image sensor according to claim 1, wherein the reading unit comprises:

a row selection module configured to control the pixel collection circuit array in a row direction;

a column selection module configured to control the pixel collection circuit array in a column direction; and a reading control module coupled to the row selection module and the column selection module, and configured to control an output of each of the row selection module and the column selection module.

12. The image sensor according to claim 1, wherein the pixel collection circuit comprises:

a photoelectric detection module configured to monitor in real time an optical signal and output a second electric signal;

a triggering generation module, a first input end of which is coupled to the photoelectric detection module, a first output end of which is coupled to an interface logic module, and which is configured to generate a triggering generation signal when the second electric signal meets a predetermined triggering condition, and output the triggering generation signal to the interface logic module; and the interface logic module coupled to the triggering generation module, and configured to communication with the reading unit via the row request line, the row selection line, the column request line and the column selection line.

13. The image sensor according to claim 12, wherein the photoelectric detection module comprises:

a photodiode, an anode of which is grounded;

a fourth transistor, a source electrode of which is coupled to a cathode of the photodiode, and a drain electrode of which is coupled to the photo current detection signal line; and a third amplifier coupled between the cathode of the photodiode and a gate electrode of the fourth transistor.

14. The image sensor according to claim 12, wherein the triggering generation module is further coupled to the pixel collection circuit enabling signal line through an enabling end, and configured to receive an enabling signal from the pixel collection circuit enabling signal line, so as to adjust the operating state of the pixel collection circuit.

* * * * *